Oct. 5, 1965    H. G. KRAUT    3,209,906
SKIN-PACKAGED ARTICLE
Filed Jan. 8, 1964

INVENTOR.
HERMAN G. KRAUT
BY
Peter L. Costas
ATTORNEY

United States Patent Office 3,209,906
Patented Oct. 5, 1965

3,209,906
SKIN-PACKAGED ARTICLE
Herman G. Kraut, New Britain, Conn., assignor to The Stanley Works, New Britain, Conn., a corporation of Connecticut
Filed Jan. 8, 1964, Ser. No. 336,587
6 Claims. (Cl. 206—80)

The present invention relates to skin-packaging, and, more particularly, to a skin-packaged article employing a novel container.

In United States Patent Number 3,031,072, granted April 24, 1962, and entitled Package and Method of Forming Same, there is described a package having an article supported on a paperboard substrate and sheathed by a thermoplastic film which is drawn thereabout and bonded to the substrate about the article by its own substance and the method of making the package. A similar method and article additionally employing an adhesive coating has been widely employed prior to the invention of the aforementioned patent, which method and article are described in many patents including United States Patent Number 2,855,735, granted October 14, 1958, and United States Patent Number 2,861,405 granted November 25, 1958. This general method of packaging using a sheathing film and a supporting substrate has commonly become known as "skin-packaging."

When skin-packaging is used for certain items of merchandise, such as razor blades and other multiple items, it is desirable to place the items in a small paperboard container which, in turn, is packaged between the substrate and film of the final composite package. When the plastic film has a heat-activatable adhesive coating or laminate on its lower surface or if its lower surface is surface-treated as described in applicant's aforementioned United States Patent No. 3,031,072, the heat-activated surface of the film may adhere to the top of the paperboard container as well as to the substrate depending upon the printing or decorating inks, the conditions of operation and the nature of the container. Generally, the adhesion will not be strong but it may be noticeable and may be sufficient to result in marring or disfiguration by removal of a portion of the paperboard surface or the printing inks when the consumer breaks open the package and removes the film from the container. Thus, the general appearance of the container and particularly of any advertising indicia may be impaired.

It is an object of the present invention to provide a skin-packaged article or composite package having therein a paperboard container which may have an attractive appearance upon removal from the composite package despite adherence of the film thereto.

It is also an object to provide such a skin-packaged article which may be easily and relatively economically produced by conventional skin-packaging methods and machinery.

Another object is to provide a paperboard container which may be packaged in a composite skin-package by conventional means and removed therefrom without marring its ultimate appearance and which is relatively inexpensive and easily manufactured.

Other objects and advantages will be readily apparent from the following detailed description and claims and the attached drawings wherein:

Figure 1:
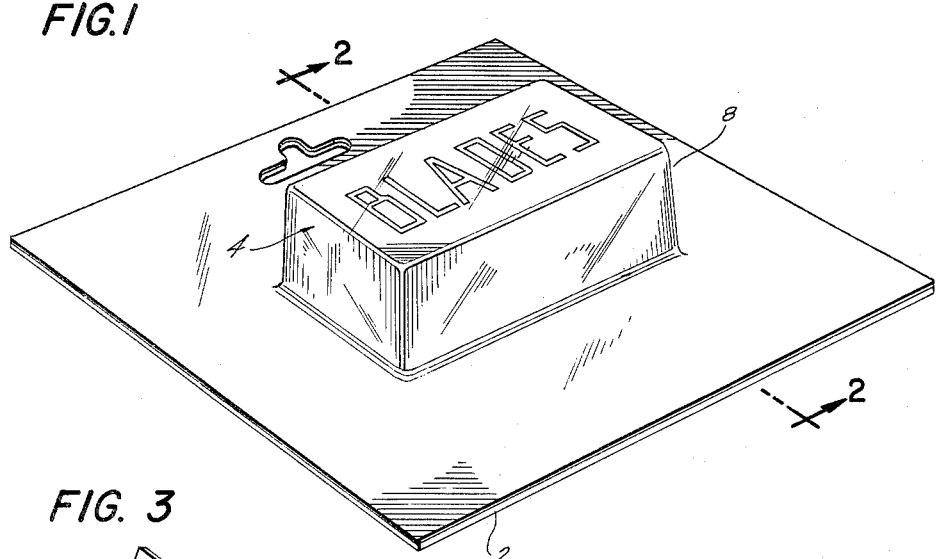
FIGURE 1 is a perspective view of a skin-package embodying the present invention with the paperboard container and printing underlying the transparent film shown in full line for clarity of illustration.

It has now been found that the foregoing and related objects may be readily attained in a composite package having a substantially air pervious substrate, a paperboard container disposed on the upper surface of the substrate with a top wall panel and a detachable cover panel overlying the top wall panel and a covering of synthetic thermoplastic film overlying the container and the substrate. The film forms a sheath closely conforming to the periphery of the container assembly and is bonded to the surface area of the substrate from adjacent the periphery of the container to the margins of the substrate.

The container has a bottom wall panel adapted to seat upon the substrate of the skin-package, side wall panels, end wall panels, a top wall panel, and a cover panel hingedly connected to one of the wall panels and overlying the top wall panel to protect the top wall panel from contacting the film of a skin-package and bonding thereto when the package is being formed.

The upper surface of the cover panel may be provided with ornamentation or a special finish such as a printed design or text for viewing through the film covering of the composite package. The top wall panel may also be provided with ornamentation or a special finish such as a printed design for viewing when the cover is detached on removal of the container from the composite package. Thus, the cover panel may carry advertising or a printed legend and the top wall may be a duplicate thereof or it may have an attractive finish or ornamentation thereon or a different legend.

For optimum economy and ease of fabrication, the container preferably is formed from an integral blank of paperboard sheet material with the cover panel hingedly connected to one of the wall panels along a perforated or otherwise weakened line for rapid and convenient detaching on removal of the container from the skin-package. Although the cover panel may be hingedly connected to one of the end wall panels or to the top wall panels or to the top wall panel, it is preferably hingedly connected to a side wall panel for ease in assembly and optimum detachability.

The term paperboard sheet material as used herein refers to sheet material of conventional papermaking fibers and synthetic fibers, and combinations thereof suitable for forming the paperboard substrates and containers of the present invention. With reference to the container, it is also intended to encompass sheet materials of synthetic plastics which are interchangeable with paperboard sheet material for the fabrication of such containers and which will exhibit the same tendency for bonding and disfiguration.

Although perforated, relatively low porosity fibrous materials may be employed for the air-pervious substrate where adhesive coatings or laminates are employed to effect bonding, the preferred and ideal substrates are porous paperboard sheet materials which will permit the drawing of a vacuum therethrough and which preferably are free from an adhesive coating. Most desirably, the paperboard is only lightly calendered to preserve the inherently porous, gas-permeable nature throughout which provides optimum bonding throughout the area of laminar contact with the film. A suitable paperboard stock, for example, is the type known in the trade as "patent coated" which has a face or top layer composed essentially of virgin pulp and high grade waste free of ground wood and presenting an attractive finish and appearance. Alternatively, other types of porous paperboard sheet material including corrugated board may be employed. In the event a colored background or base color is to be used to provide an attractive appearance, it is most desirable to select a paperboard sheet material which has been vat dyed with the desired color during its manufacture to eliminate the necessity for printing the background color upon the paperboard.

When the bonding of the film to the paperboard is by the substance of the film itself as set forth in applicant's aforementioned patent, care should be taken to select printing inks for the paperboard which will not unduly interfere with the bonding process since certain inks contain sufficiently high quantities of binders or fillers to interfere with the porosity of the paperboard stock or to otherwise interfere with the bonding operations. Similarly, when the bonding of the film is by the substance of the film itself, the substrate should be substantially imperforate in the area of laminar contact to achieve optimum uniformity of bonding throughout the area of laminar contact. However, incidental perforations may also be incorporated for purposes of hanging the packages, or for tearing the substrate by the user to open the package, or about the article to permit more rapid draw of the film about the article into a sheath as may be desirable when the article is large and requires a large degree of draw. Where an adhesive coating or laminate is employed to effect the bond, the substrate may be nonporous and the area of surface contact may contain perforations as are often utilized to permit drawing a vacuum therethrough. In either instance, the substrate should be of sufficient rigidity for the packaging application.

Although the above method may be desirably employed with films having an adhesive coating or laminate, the most desirable films employed are polyolefins having at least their lower surface at least partially oxidized or surface-treated to render the lower surface more susceptible to activation by heat than the body of the film as disclosed and claimed in applicant's aforementioned United States Patent Number 3,031,072. Generally, such films may have their surface oxidized during the process of extrusion, electrostatically, chemically or flame-treated, or otherwise treated to provide the desired surface characteristics.

The films used for the present invention may be of a thickness of about 2 to 11 mils, and preferably about 3 to 7 mils, depending upon the degree of distention or draw required to form the sheath about the article and the weight of the article. Heavier gauge films may be employed albeit with greater cost and longer periods of heating to achieve the desired deformability. The preferred films are surface-treated polyolefins as described in applicant's aforementioned patent, and particularly, surface-treated polyethylene films or about 3 to 7 mils in thickness.

The suction applied to the molding element and substrate should be sufficient to distend the film into a tight-fitting sheath about the articles and to draw the film into tight surface contact with the substrate. In the instance of the method of the aforementioned United States Patent Number 3,031,072, the suction should be sufficient to draw the surface of the film into the pores of the papareboard. In a commercial embodiment, suction rated at about 23 inches of mercury (about 11.5 pounds per square inch) has proven highly satisfactory. The actual amount of suction required will vary with the permeability or porosity and the rigidity of the substrate and the conditions of operation. Generally, the suction is applied for about two to twenty seconds to bring the film and substrate into laminar engagement, and a period of about three to ten seconds is satisfactory for most operations.

Figure 2:
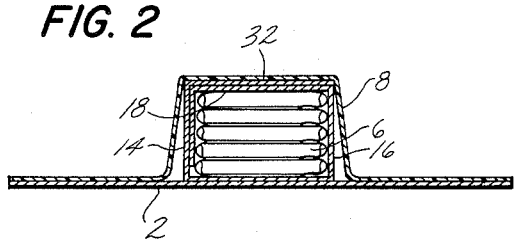
FIGURE 2 is a sectional view to a slightly reduced scale along the line 2—2 of FIGURE 1.

Referring now in detail to FIGURES 1 and 2 of the attached drawing, therein illustrated is a composite package embodying the present invention and comprised of a paperboard substrate 2, a paperboard container generally designated by the numeral 4 with a plurality of individually wrapped razor blades 6 therein and seated on the upper surface of the substrate 2, and a covering of synthetic thermoplastic film 8 forming a sheath closely conforming to the periphery of the container 4 and bonded to the surface area of the substrate from adjacent the periphery of the container to the margins of the substrate.

Figure 3:
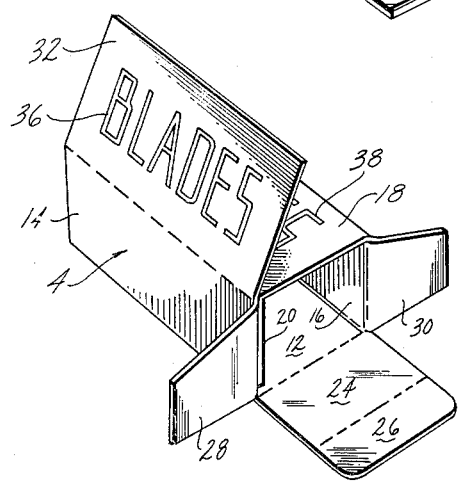
FIGURE 3 is a perspective view of the paperboard container of FIGURE 1 with one end and the removable cover panel opened for clarity of illustration.
Figure 4:
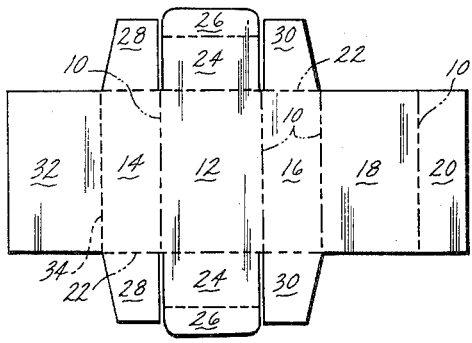
FIGURE 4 is a plan view to a reduced scale of the blank for the container of FIGURE 3.

Turning in detail to the container 4, the structure thereof is best seen in the blank of FIGURE 4 and the partially assembled structure of FIGURE 3. The blank is provided with a plurality of longitudinal fold lines 10 which define a bottom wall panel 12, side wall panels 14 and 16 hingedly connected along the side margins of the bottom wall panel 12, a top wall panel 18 hingedly connected to the side wall panel 16, and a glue flap 20 hingedly connected along the edge of the top wall panel 18.

The transverse fold lines 22 define end wall panels 24 at the ends of the bottom wall panel 12, and tuck flaps 26 at the free ends thereof to provide facile tuck closures for the ends of the container. The end wall panels 24 cooperate with dust flaps 28, 30 which are hingedly connected at the ends of side wall panels 14, 16 respectively, to provide relatively dust-free closures for the erected container 4. Cover panel 32 is hingedly connected to the edge of side wall panel 14 along the perforated tear line 34 to fold over and loosely overlie top wall panel 18 in the erected container.

In assembling the illustrated container embodiment, the glue flap 20 and the inner surface of the side wall panel 14 are bonded by a suitable adhesive (not shown) to lock the blank into erected position. As seen in FIGURE 3, the cover panel 32 is partially folded about the tear line 34, and both the cover panel 32 and the top wall panel 18 have printed matter thereon indicated by the numerals 36, 38, respectively, exemplified in the illustration by the word "BLADES." However, it will be readily appreciated that surface ornamentation or even an attractive plain finish may be employed upon one or both panels depending upon the intended application and effect.

The term "surface ornamentation" as used hereinafter refers to finished surfaces for a merchandise container including printed, dyed and filled surfaces providing an attractive surface appearance from a merchandising standpoint and encompasses advertising copy.

In making the composite package, the container 4 is placed upon the upper surface of the substrate 2 and the thermoplastic film 8, a surface-treated polyolefin film or a film with an adhesive coating or laminate is heated to deformability and to activate the lower surface to the desired tackiness while supported in a position spaced above the substrate 2 and container 4. Suction is applied to the lower surface of the substrate 2 as the film 8 and container 4 and substrate 2 are moved into closely spaced position so that the suction draws the film downwardly about the container 4 into a close-fitting sheath and into laminar contact and bonding engagement with the substrate 2 from adjacent the periphery of the container 4 to the margins thereof.

As the tacky film contacts and is drawn tightly against the upper surface of the container 4, there is a pronounced tendency for the tacky surface to adhere to the paperboard particularly when the container 4 permits some suction to be drawn therethrough. In the present invention, the film 8 will adhere to the cover panel 32 rather than the top wall panel 18. Because of the nature of the forming operation, the film 8 generally is spaced slightly from the vertical panels of the container and any adhesion therebetween is relatively minor and less than sufficient to disfigure or mar the surface thereof. In the final package, the surface ornamentation of the cover panel 32 will be clearly visible through the transparent film 8.

When removing the container 4 from the composite package, the consumer may tear the film 8 from the cover panel 32 to break the bond therebetween, thereby marring or obliterating the surface ornamentation thereon. The consumer may conveniently detach the loose cover panel 32 from the remainder of the container along the tear line 34 thus uncovering the top wall panel 18 for continuing exposure of the printed matter 38 thereon.

If the paperboard material at the tear line 34 has been sufficiently weakened, the bond between the film 8 and the cover panel 32 may be strong enough to tear the cover panel 32 away from the remainder of the container 4 as the container is removed from the package, thus obviating the separate step of detaching the cover panel 32 after removal from the film 8.

Thus it can be seen that the present invention provides a novel composite package having a paperboard container therein which may have an attractive appearance upon removal of the composite package despite adherence of the film thereto. The package may be conveniently and economically formed by existing skin-packaging machinery and methods. The novel paperboard container of the present invention may be economically and conveniently formed from an integral paperboard blank for rapid and facile inclusion in a composite package.

Having thus described the invention, I claim:

1. A composite skin-package having a substantially air-pervious substrate; a container of paperboard sheet material disposed on the upper surface of said substrate having a top wall panel and a detachable cover panel overlying all of said top wall panel; and a covering of synthetic thermoplastic film overlying said container and said substrate, said film forming a sheath firmly overlying said cover panel in intimate contact therewith and closely conforming to the periphery of said container, said film being bonded to said cover panel and being bonded to the surface area of said substrate from adjacent the periphery of said container to the margins of said substrate.

2. The package of claim 1 wherein said substrate is substantially porous paperboard sheet material and said thermoplastic film is polyolefin film with the lower side thereof surface-treated, said film being bonded by its own substance to said substrate and said cover panel.

3. The package of claim 2 wherein said polyolefin film is polyethylene film of about 2–11 mils in thickness.

4. A composite skin-package having a substantially air-pervious substrate; a container of paperboard sheet material disposed on the upper surface of said substrate and having a bottom wall panel lying against said substrate, side wall panels, end wall panels and a top wall panel, said container also having a cover panel hindgedly connected to one of said wall panels and overlying all of said top wall panel to protect the upper surface of said top wall panel from bonding contact with said film, the paperboard material of said container being weakened along said hinged connection of said cover panel for facile severing thereof; and a covering of synthetic thermoplastic film overlying said container and said substrate, said film forming a sheath firmly overlying said cover panel in intimate contact therewith and closely conforming to the periphery of said cover panel is provided with surface ornamentation panel and being firmly bonded to the surface area of said substrate from adjacent the periphery of said container to the margins of said substrate.

5. The package of claim 4 wherein the upper surface of said cover panel is provided with surface ornamentation for viewing through said film, and wherein said top wall panel is provided with surface ornamentation for viewing when said cover panel is detached.

6. The package of claim 4 wherein said cover panel is hinged to one of said side wall panels.

References Cited by the Examiner

UNITED STATES PATENTS

| | | | |
|---|---|---|---|
| 1,116,043 | 11/14 | Elliott | 229—38 |
| 2,861,404 | 11/58 | Stratton | 206—78 |
| 2,876,899 | 3/59 | Maynard | 206—80 |
| 3,031,072 | 4/62 | Kraut | 206—80 |

THERON E. CONDON, *Primary Examiner.*

UNITED STATES PATENT OFFICE
CERTIFICATE OF CORRECTION

Patent No. 3,209,906　　　　　　　　　　　　　　　　October 5, 1965

Herman G. Kraut

It is hereby certified that error appears in the above numbered patent requiring correction and that the said Letters Patent should read as corrected below.

Column 6, lines 18 and 19, strike out "cover panel is provided with surface ornamentation panel" and insert instead -- container, said film being bonded to said cover panel --.

Signed and sealed this 26th day of April 1966.

(SEAL)
Attest:

ERNEST W. SWIDER
Attesting Officer

EDWARD J. BRENNER
Commissioner of Patents